United States Patent
Wang et al.

(10) Patent No.: US 12,321,785 B2
(45) Date of Patent: Jun. 3, 2025

(54) METHOD, ELECTRONIC DEVICE, AND COMPUTER PROGRAM PRODUCT FOR TASK ALLOCATION UTILIZING REINFORCEMENT LEARNING MODEL

(71) Applicant: Dell Products L.P., Round Rock, TX (US)

(72) Inventors: Zijia Wang, WeiFang (CN); Jiacheng Ni, Shanghai (CN); Qiang Chen, Shanghai (CN); Zhen Jia, Shanghai (CN)

(73) Assignee: Dell Products L.P, Round Rock, TX (US)

( * ) Notice: Subject to any disclaimer, the term of this patent is extended or adjusted under 35 U.S.C. 154(b) by 478 days.

(21) Appl. No.: 17/852,528

(22) Filed: Jun. 29, 2022

(65) Prior Publication Data

US 2023/0401097 A1  Dec. 14, 2023

(30) Foreign Application Priority Data

Jun. 10, 2022 (CN) .......................... 202210659618.3

(51) Int. Cl.
  *G06F 9/50* (2006.01)
  *G06F 9/48* (2006.01)
(52) U.S. Cl.
  CPC .......... *G06F 9/5033* (2013.01); *G06F 9/4881* (2013.01)
(58) Field of Classification Search
  None
  See application file for complete search history.

(56) References Cited

U.S. PATENT DOCUMENTS

| | | | | |
|---|---|---|---|---|
| 7,895,071 | B2* | 2/2011 | Khosla | G06Q 10/06312 |
| | | | | 705/7.12 |
| 9,298,506 | B2* | 3/2016 | Rabinovici | G06F 9/5011 |
| 9,575,811 | B2* | 2/2017 | Farhan | G06F 9/5011 |
| 9,766,942 | B2* | 9/2017 | Miyashita | G06F 9/5038 |
| 10,621,001 | B1* | 4/2020 | Braverman | G06F 9/4881 |
| 10,628,223 | B2* | 4/2020 | Purnaprajna | G06F 9/4881 |
| 10,705,878 | B2* | 7/2020 | Liu | G06F 9/5066 |
| 11,411,815 | B1* | 8/2022 | Shrestha | H04L 43/0876 |

(Continued)

OTHER PUBLICATIONS

J. Oh et al., "Value Prediction Network," Advances in Neural Information Processing Systems, arXiv:1707.03497v2, Nov. 6, 2017, 16 pages.

(Continued)

*Primary Examiner* — Van H Nguyen
(74) *Attorney, Agent, or Firm* — Ryan, Mason & Lewis, LLP (57) ABSTRACT

A method in an illustrative embodiment includes: obtaining an initial state of a group of dedicated processing resources; determining, in response to a request for receiving a group of tasks, a set of candidate allocations each indicating allocation of the group of tasks to the group of dedicated processing resources; determining, based on the initial state, an operating state of the group of dedicated processing resources when executing the group of tasks according to each candidate allocation in the set of candidate allocations; and selecting a target allocation from the set of candidate allocations based on the operating state to enable the group of tasks to be executed on the group of dedicated processing resources according to the target allocation.

20 Claims, 6 Drawing Sheets

(56) References Cited

U.S. PATENT DOCUMENTS

| | | | |
|---|---|---|---|
| 11,900,155 B2* | 2/2024 | Nie | G06F 9/5044 |
| 12,056,525 B2* | 8/2024 | Morris | G06F 9/48 |
| 2015/0128148 A1* | 5/2015 | Miyashita | G06F 9/5066 |
| | | | 718/104 |
| 2018/0300653 A1* | 10/2018 | Srinivasan | H04L 67/06 |
| 2021/0165685 A1* | 6/2021 | Nie | G06F 9/5083 |

OTHER PUBLICATIONS

V. Mnih et al., "Asynchronous Methods for Deep Reinforcement Learning," International Conference on Machine Learning, arXiv:1602.01783v2, Jun. 16, 2016, 19 pages.

* cited by examiner

METHOD, ELECTRONIC DEVICE, AND COMPUTER PROGRAM PRODUCT FOR TASK ALLOCATION UTILIZING REINFORCEMENT LEARNING MODEL

RELATED APPLICATION(S)

The present application claims priority to Chinese Patent Application No. 202210659618.3, filed Jun. 10, 2022, and entitled "Method, Electronic Device, and Computer Program Product for Task Allocation," which is incorporated by reference herein in its entirety.

FIELD

Embodiments of the present disclosure relate to the field of computers, and more particularly, to a method, an electronic device, and a computer program product for task allocation.

BACKGROUND

At present, the application of a graphics processing unit (GPU) as a co-processor or accelerator in general computing fields (such as database, data compression, etc.) has become a major trend in the industry. Compared with a central processing unit (CPU), a GPU has advantages of larger-scale concurrent threads and a higher memory bandwidth, and is more suitable for large-scale data parallelism or computing parallelism tasks.

However, for application scenarios with a large number of data streams and a high data generation frequency, stream processing tasks are featured with continuity and a large number of concurrent tasks, but a single stream processing task is featured with a small amount of computation. Therefore, GPUs need to be frequently scheduled when used to process data streams, and at the same time, GPUs and the environments and requirements of processing tasks are frequently changing, which involves a complex problem of allocation of the processing tasks and poses challenges accordingly.

SUMMARY

Embodiments of the present disclosure provide a solution of allocating processing tasks to dedicated processing resources according to predictive information.

In a first aspect of the present disclosure, a method for allocating tasks to dedicated processing resources is provided. The method includes: obtaining an initial state of a group of dedicated processing resources; determining, in response to a request for receiving a group of tasks, a set of candidate allocations each indicating allocation of the group of tasks to the group of dedicated processing resources; determining, based on the initial state, an operating state of the group of dedicated processing resources when executing the group of tasks according to each candidate allocation in the set of candidate allocations; and selecting a target allocation from the set of candidate allocations based on the operating state to enable the group of tasks to be executed on the group of dedicated processing resources according to the target allocation.

In a second aspect of the present disclosure, an electronic device is provided. The electronic device includes a processor and a memory coupled to the processor. The memory has instructions stored therein which, when executed by the processor, cause the device to perform actions. The actions include: obtaining an initial state of a group of dedicated processing resources; determining, in response to a request for receiving a group of tasks, a set of candidate allocations each indicating allocation of the group of tasks to the group of dedicated processing resources; determining, based on the initial state, an operating state of the group of dedicated processing resources when executing the group of tasks according to each candidate allocation in the set of candidate allocations; and selecting a target allocation from the set of candidate allocations based on the operating state to enable the group of tasks to be executed on the group of dedicated processing resources according to the target allocation.

In a third aspect of the present disclosure, a computer program product is provided. The computer program product is tangibly stored on a computer-readable medium and includes machine-executable instructions. The machine-executable instructions, when executed by a machine, cause the machine to perform the method according to the first aspect.

This Summary is provided to introduce the selection of concepts in a simplified form, which will be further described in the Detailed Description below. The Summary is neither intended to identify key features or main features of the present disclosure, nor intended to limit the scope of the present disclosure.

BRIEF DESCRIPTION OF THE DRAWINGS

By more detailed description of example embodiments of the present disclosure, provided herein with reference to the accompanying drawings, the above and other objectives, features, and advantages of the present disclosure will become more apparent, where identical reference numerals generally represent identical components in the example embodiments of the present disclosure. In the drawings.

DETAILED DESCRIPTION

Principles of the present disclosure will be described below with reference to several example embodiments illustrated in the accompanying drawings. Although the drawings show example embodiments of the present disclosure, it should be understood that these embodiments are merely described to enable those skilled in the art to better understand and further implement the present disclosure, and not to limit the scope of the present disclosure in any way.

As used herein, the term "include" and variations thereof mean open-ended inclusion, that is, "including but not limited to." Unless specifically stated, the term "or" means "and/or." The term "based on" means "based at least in part on." The terms "an example embodiment" and "an embodiment" indicate "at least one example embodiment." The term "another embodiment" indicates "at least one additional embodiment." The terms "first," "second," and the like may refer to different or identical objects. Other explicit and implicit definitions may also be included below.

As discussed above, in general, for example, the problem of resource allocation for processing tasks can be solved by reinforcement learning. However, existing reinforcement learning schemes still have some shortcomings. For example, future information is not taken into account when the problem of resource allocation is solved. As a result, the obtained allocation scheme is not optimal. Therefore, it would be beneficial to find a more optimized allocation scheme to improve the efficiency of processing resources to execute tasks.

A solution for allocating tasks to dedicated processing resources is provided in embodiments of the present disclosure to solve the above problem and one or more other potential problems. In the solution, an operating state when processing tasks are executed according to a candidate allocation is predicted based on a current state of the dedicated processing resources. Then, based on a specific criteria associated with the predicted operating state, an allocation scheme that meets the criteria is selected from all the candidate allocations. Thus, future operating state information is taken into account in the selection of the allocation scheme. In this manner, a more comprehensive scheme selection can be achieved, so as to find a more optimized scheme to improve the performance of processing resources executing tasks.

Figure 1:
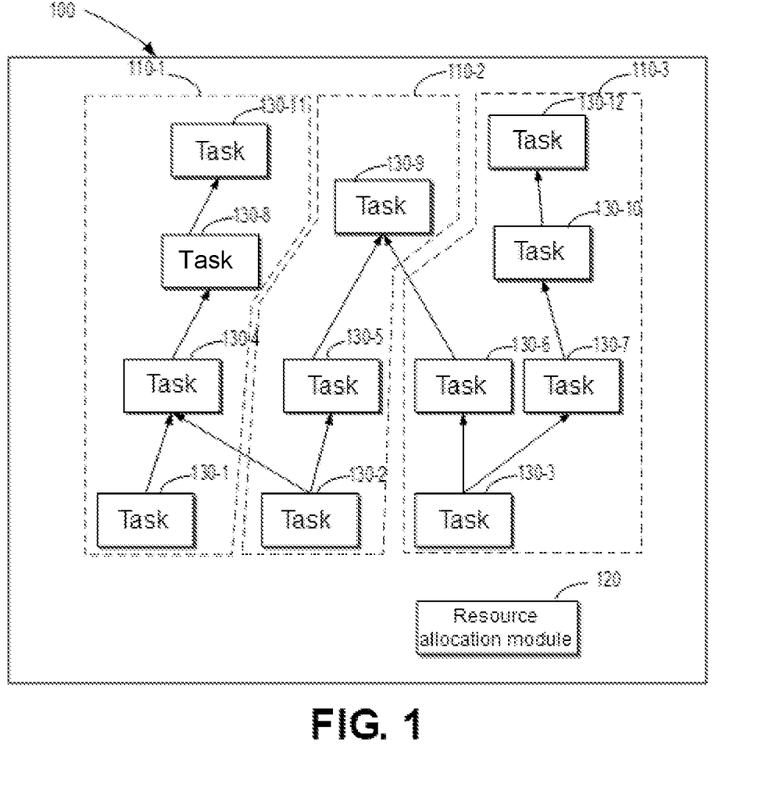
FIG. 1 is a schematic diagram of a system in which an embodiment of the present disclosure can be implemented.

FIG. 1 is a schematic diagram of system 100 in which an embodiment of the present disclosure can be implemented. As shown in FIG. 1, system 100 generally includes a group of dedicated processing resources 110-1, 110-2, and 110-3 and resource allocation module 120 for scheduling the dedicated processing resources. In some embodiments, the dedicated processing resources may be either CPUs or GPUs. It should be understood that the architecture and functions of system 100 are described for illustrative purposes only, and do not imply any limitation to the scope of the present disclosure. Embodiments of the present disclosure may also be applied to environments involving data protection systems and having different structures and/or functions.

System 100 is capable of processing received computation jobs by using dedicated processing resources 110-1, 110-2, and 110-3. In some embodiments, the computation jobs may be modular processing jobs, such as a computational graph in a Tensorflow architecture. The modular processing jobs may include a plurality of tasks, such as various operations in the computational graph. The modular processing jobs may be divided into a plurality of modules based on arithmetic logic. Each module includes a portion of the tasks, and the modules can operate concurrently on a plurality of different CPUs or GPUs.

As shown in FIG. 1, the modular processing jobs include, for example, a plurality of tasks 130-1, 130-2, 130-3, 130-4, 130-5, 130-6, 130-7, 130-8, 130-9, 130-10, 130-11 and 130-12. It should be understood that the plurality of tasks may belong to a single processing job or be in different processing jobs. In the embodiment shown, task 130-1, task 130-4, task 130-8, and task 130-11 are allocated to dedicated processing resource 110-1 for execution. Task 130-2, task 130-5, and task 130-9 are allocated to dedicated processing resource 110-2 for execution. Task 130-3, task 130-6, task 130-7, task 130-10, and task 130-12 are allocated to dedicated processing resource 110-3 for execution. According to arithmetic logic of the processing jobs, task 130-4 needs to call processing results of task 130-1 and task 130-2, so task 130-1 and task 130-2 are executed before task 130-4. By analogy with the above, as shown in FIG. 1, the processing jobs may be divided into four steps (also referred to as stages). In the first step, task 130-1, task 130-2, and task 130-3 are executed. In the second step, task 130-4, task 130-5, task 130-6, and task 130-7 are executed. In the third step, task 130-8, task 130-9, and task 130-10 are executed. In the fourth step, task 130-11 and task 130-12 are executed. So far, the processing jobs have been completed.

Since tasks in the same step may be implemented concurrently, the tasks in the same step are all allocated to different dedicated processing resources, and the same dedicated processing resource can also process a plurality of tasks simultaneously. Therefore, in the embodiment shown in FIG. 1, there are $3^3$ manners to allocate task 130-1, task 130-2, and task 130-3 in the first step to dedicated processing resource 110-1, dedicated processing resource 110-2, and dedicated processing resource 110-3. Resource allocation module 120 can execute all tasks by selecting a target allocation manner from all the allocation manners based on a preset rule.

Figure 2:
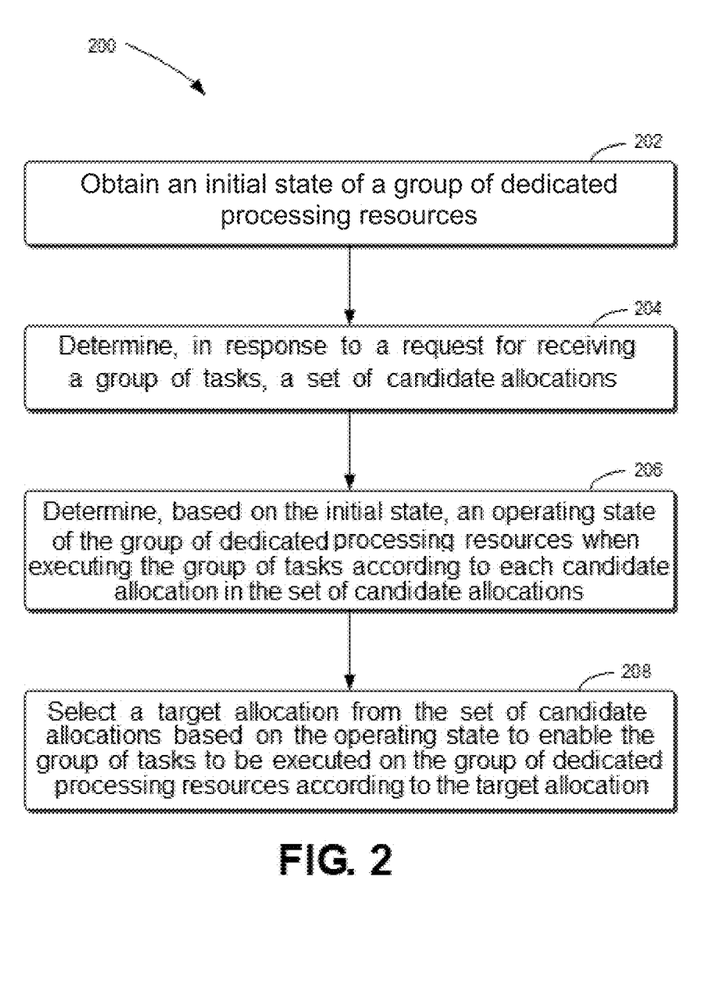
FIG. 2 is a flow chart of an example method for allocating tasks to dedicated processing resources according to an embodiment of the present disclosure.

Example embodiments of the present disclosure will be described in detail below with reference to FIG. 2 to FIG. 4. FIG. 2 is a flow chart of example method 200 for allocating tasks to dedicated processing resources according to an embodiment of the present disclosure. Method 200 in FIG. 2 may be executed by, for example, resource allocation module 120 in FIG. 1.

At 202, resource allocation module 120 obtains an initial state of a group of dedicated processing resources. Herein, the initial state represents a state of the group of dedicated processing resources at a time point before tasks are received, or a state when a task request is received and received tasks have not been processed. In some embodiments, the initial state may be all relevant states associated with task processing in the dedicated processing resources. For example, the initial state may include available bandwidths and computing capability indexes of the dedicated processing resources, or tasks being executed on the dedicated processing resources.

At 204, resource allocation module 120 determines a set of candidate allocations in response to a request for receiving a group of tasks. Herein, each candidate allocation indicates allocation of the group of tasks to the group of dedicated processing resources. In some embodiments, when the received tasks are executed in a logical order of steps, each candidate allocation may indicate in which step each task in the group of tasks is allocated to which dedicated processing resource. In some embodiments, the set of candidate allocations may include all achievable allocation manners. Alternatively or additionally, all available allocation manners can be screened according to certain rules or practical experience, thus reducing the size of the set of candidate allocations.

In some embodiments, resource allocation module 120 may determine a step in which each task is executed, that is, a sequence in which the tasks are executed. Resource allocation module 120 divides the group of tasks into a plurality of task subsets based on the sequence of the tasks. Herein, each task subset includes tasks having the same sequence of the steps. Then, resource allocation module 120 determines a set of candidate partial allocations for each task subset. Each of the candidate partial allocations indicates to which dedicated processing resource each task in the task subset is allocated. Finally, sets of candidate partial allocations for the steps are combined according to the sequence of steps to obtain the set of candidate allocations for all tasks.

At 206, resource allocation module 120 determines, based on the initial state, an operating state of the group of dedicated processing resources when executing the group of tasks according to each candidate allocation in the set of candidate allocations. After obtaining the set of candidate allocations, resource allocation module 120 may perform a simulation, for example, based on each candidate allocation and the initial state to obtain the corresponding operating state of the group of dedicated processing resources when executing the group of tasks according to each candidate allocation.

In an embodiment of executing tasks according to steps as discussed above, an operating state when a task subset in a first step is executed can be determined based on the initial state and a set of candidate partial allocations for the task subset to be executed first (that is, the task subset executed in the first step). Then, an operating state when a current step is executed is determined by iteration based on the operating state when the previous step is executed and the candidate partial allocation of the current step. The operating state when the group of tasks are executed includes corresponding operating states when all the task subsets are executed.

At 208, resource allocation module 120 selects a target allocation from the set of candidate allocations based on the operating state to enable the group of tasks to be executed on the group of dedicated processing resources according to the target allocation. In some embodiments, resource allocation module 120 may make a selection according to a rule associated with a predicted operating state. For example, the rule may be based on specific performance indexes of the group of dedicated processing resources in the predicted operating state.

Therefore, through the operating state predicted based on the simulation of the dedicated processing resources executing tasks, factors taken into account are more comprehensive in the selection of a manner of allocating tasks to processing resources to obtain a more optimized allocation manner, so as to improve the efficiency of the dedicated processing resources to execute tasks.

In an embodiment of executing tasks according to steps as discussed above, resource allocation module 120 may determine steps in which tasks in the group of tasks are executed, and then select the target allocation from the set of candidate allocations based on the operating state, the candidate allocations, and the number of steps in which the group of tasks are executed. In such embodiments, resource allocation module 120 may parameterize the operating state, the allocation manner, and the number of steps based on certain rules, so as to make use of parameterized representations for selection. For example, a measure of processing capability of the group of dedicated processing resources in the operating state may be determined. The time to execute the tasks according to the candidate allocations may also be determined to characterize the efficiency of the candidate allocations by processing time. Finally, a weight for the operating state may be determined. The influence of the predicted operating state on the current allocation manner may decrease with the increase of steps, that is, the increase of the prediction time span. Therefore, weights of the performance indexes for the operating state in the selection may be determined according to the number of the steps. In some embodiments, the parameterization is implemented through a prediction model based on reinforcement learning.

The prediction model of reinforcement learning will be described in detail below with reference to FIGS. 3A and 3B.

Figure 3A:
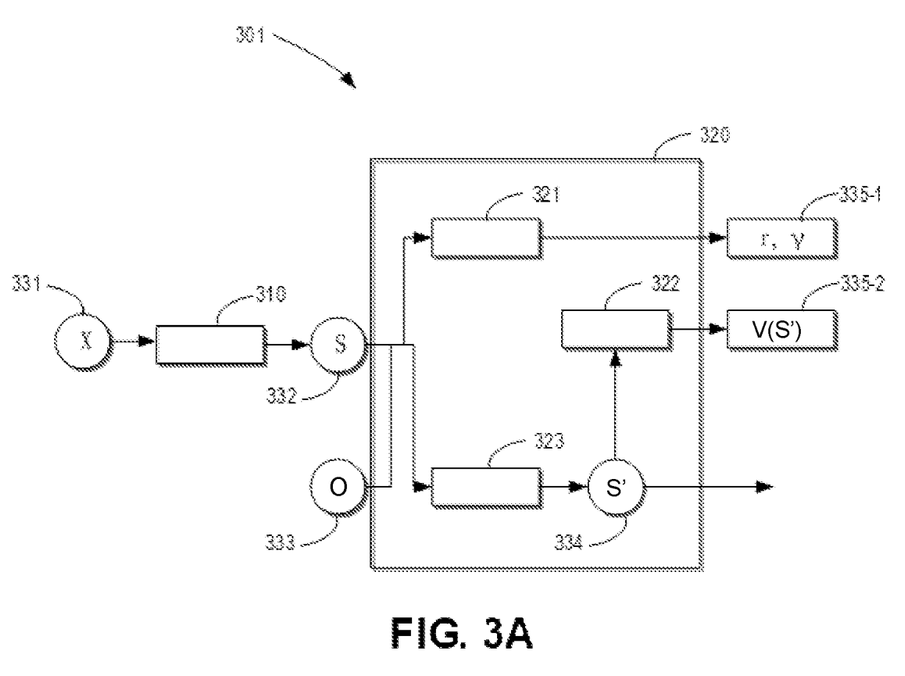
FIGS. 3A to 3B are schematic diagrams of an example structure of a state model according to some embodiments of the present disclosure.

FIG. 3A is a schematic diagram of example process 301 implemented by using a prediction model according to some embodiments of the present disclosure. The prediction model is a model-based reinforcement learning model. Reinforcement learning is a sequence determination process in which an agent learns an optimal strategy by interacting with the environment. As shown in FIG. 3A, when a request for processing a group of tasks is received, initial state X 331 of the dedicated processing resource obtained is inputted into encoding module 310 to obtain parameterized initial state representation S 332. Obtained parameterized initial state representation S 332 and operation O 333 are inputted into core prediction module 320. Operation O 333 indicates that the group of tasks are allocated to a group of dedicated processing resources according to candidate allocations. In core prediction module 320, parameterized initial state representation S 332 and operation O 333 are inputted into output module 321 to obtain input 335-1, that is, reward r and discount γ for operation O 333. For example, reward r may represent the efficiency for candidate allocations. For example, discount γ may correspond to a weight for the operating state. Parameterized initial state representation S 332 and operation O 333 are further inputted into conversion module 323 to obtain predicted operating state representation S' 334 of the group of dedicated processing resources after executing operation O 333. Predicted operating state representation S' 334 is inputted into value module 322 to obtain value V(S') 335-2 for predicted operating state representation S' 334. At the same time, predicted operating state representation S' 334 is also outputted to facilitate subsequent processing.

In this manner, by inputting an initial state, an allocation manner, and a corresponding task into the prediction model, a parameterization representation of the predicted operating state (predicted operating state representation S'), a weight for the parameterization representation (discount γ), and a parameterization representation for the efficiency of the candidate allocations (reward r) can be obtained, so that each candidate allocation can be quantitatively evaluated by using obtained parameterized data, so as to select the target allocation under comprehensive consideration.

In some embodiments, the evaluation for the candidate allocation may be executed based on the following function:

$$Q_\theta(s, o) = r + \gamma V_\theta(s') \quad (1)$$

where $Q_\theta(s, o)$ denotes comprehensive evaluation of operation o executed by a group of dedicated processing resources in initial state s, r denotes a reward obtained by using the prediction model, γ denotes a discount obtained, and $V_\theta(s')$ denotes a value obtained for the predicted operating state s'. For example, comprehensive evaluation of operations that correspond to all the allocation manners may be calculated, and then the target allocation is selected based on the comprehensive evaluation.

Figure 3B:
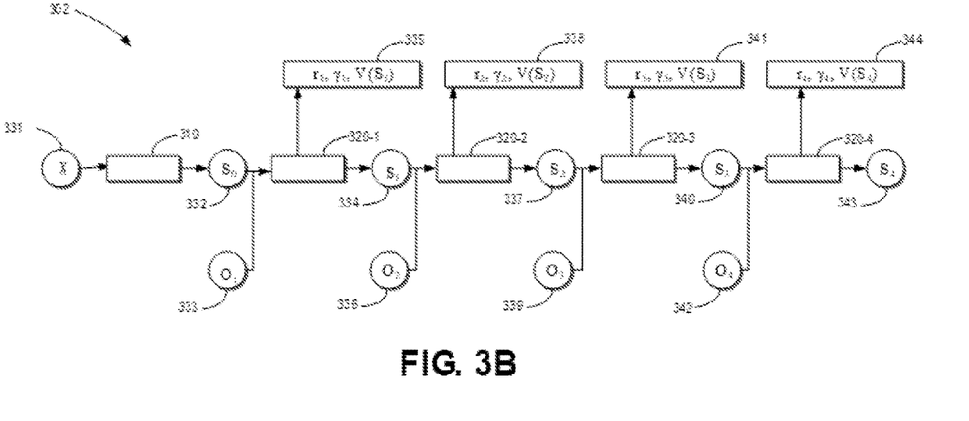

FIG. 3B is a schematic diagram of example process 302 for tasks executed in a sequence of steps by using a prediction model according to some embodiments of the present disclosure. As shown in FIG. 3B, a sequence in which a group of tasks are executed may be determined when a request for processing the group of tasks is received. For example, a group of tasks 130 in FIG. 1 are received. As discussed in FIG. 1, task 130 may be divided into four steps. Thus, task subsets of tasks executed in the steps can be determined. At the same time, a corresponding candidate partial allocation is determined for each task subset, so as to obtain operation $O_1$ 333 for the first step, operation $O_2$ 336 for the second step, operation $O_3$ 339 for the third step, and operation $O_4$ 342 for the fourth step. Similar to the process shown in FIG. 3A, initial state X of the dedicated processing resource obtained is inputted into encoding module 310 to obtain parameterized initial state representation S 332. Obtained parameterized initial state representation S 332 and operation $O_1$ 333 for the first step are inputted to core prediction module 320-1 to obtain output 335, that is, reward $r_1$, discount $\gamma_1$, value $V(S_1)$, and predicted operating state $S_1$ 334 (corresponding to S' in FIG. 3A). Then, operating state $S_1$ 334 and operation $O_2$ 336 for the second step are inputted to core prediction module 320-2 to obtain output 338, that is, reward $r_2$, discount $\gamma_2$, value $V(S_2)$, and predicted operating state $S_2$ 337. Then, operating state $S_2$ 337 and operation $O_3$ 339 for the third step are inputted to core prediction module 320-3 to obtain output 341, that is, reward $r_3$, discount $\gamma_3$, value $V(S_3)$, and predicted operating state $S_3$ 340. Finally, operating state $S_3$ 340 and operation $O_4$ 342 for the fourth step are inputted to core prediction module 320-4 to obtain output 344, that is, reward $r_4$, discount $\gamma_4$, value $V(S_4)$, and predicted operating state $S_4$ 343.

In this way, the corresponding parameterized data for the partial allocation of the task subset of each step is determined based on the initial state, so that each candidate allocation can be quantitatively evaluated by using the parameterized data obtained, so as to select the target allocation under comprehensive consideration. In some embodiments, the evaluation for the candidate allocation may be executed based on the following function:

$$Q_\theta^d(s, o) = r + \gamma V_\theta^d(s') \qquad (2)$$

$$V_\theta^d(s) = \begin{cases} V_\theta(s) & \text{if } d = 1 \\ \frac{1}{d}V_\theta(s) + \frac{d-1}{d}\max_o Q_\theta^{d-1}(s, o) & \text{if } d > 1 \end{cases}$$

where d denotes a step of a task, $Q_\theta^d(s, o)$ denotes comprehensive evaluation of step d in operation o executed by a group of dedicated processing resources in initial state s, r denotes a reward obtained by using the prediction model, $\gamma$ denotes a discount obtained, and $V_\theta^d(s)$ denotes a value of operating state s predicted for step d. It can be seen that $Q_\theta^d(s, o)$ is calculated according to $V_\theta^d(s)$, and $V_\theta^d(s)$ is calculated step by step recursively. The evaluation process for the allocation scheme will be described below with reference to FIG. 4.

Figure 4:
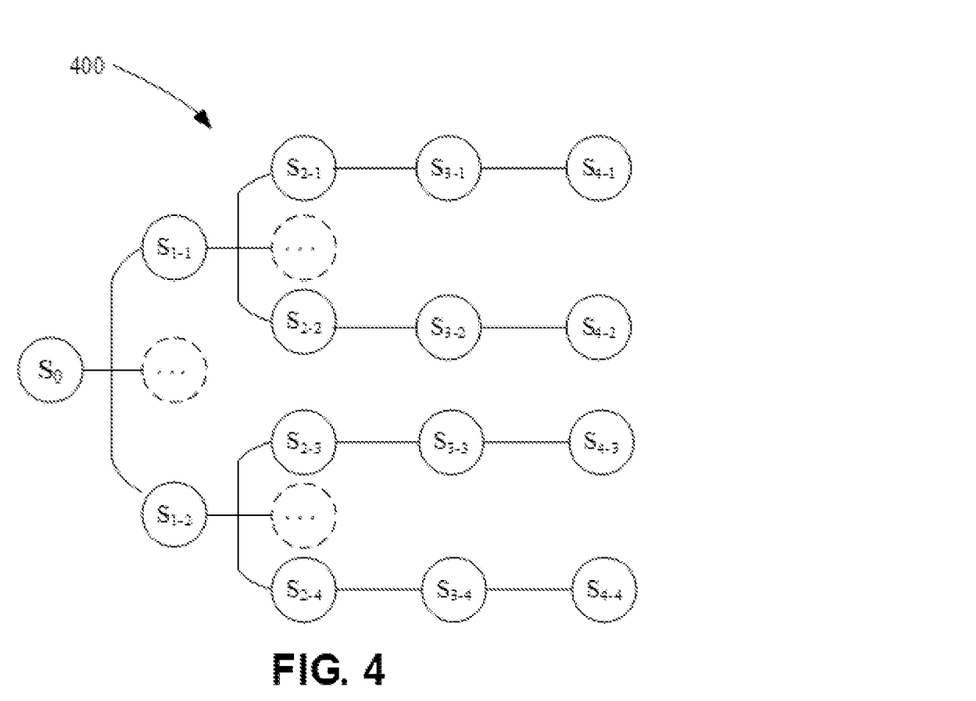
FIG. 4 is a schematic diagram of determination of a task allocation according to some embodiments of the present disclosure.

FIG. 4 is a schematic diagram of example process 400 of determining a target allocation according to some embodiments of the present disclosure. As shown in FIG. 4, each circular node in the figure represents an operating state representation of a dedicated processing resource after executing an operation at a corresponding step, and the arrow-free edge in the figure indicates that core prediction module 320 is used for calculation.

As shown in FIG. 4, for example, after task 130 in FIG. 1 is received, it is determined that task 130 may be divided into four steps, and task 130 is divided into four task subsets, i.e., a first task subset including task 130-1, task 130-2, and task 130-3, a second task subset including task 130-4, task 130-5, task 130-6, and task 130-7, a third task subset including task 130-8, task 130-9, and task 130-10, and a fourth task subset including task 130-11 and task 130-12. At the same time, initial state representation $S_0$ is also obtained. The tasks need to be allocated first in initial state $S_0$. For the first task subset, it is determined that the set of candidate partial allocations include $3^3$ partial allocation manners. Then, parameterized data of the first task subset executed according to each partial allocation manner is calculated by using core prediction module 320, and $Q_{1-X}$ is calculated according to Formula (2). $Q_{1-X}$ represents comprehensive evaluation of the first step under the $x_{th}$ partial allocation. Upon completion of the comprehensive evaluation for all partial allocations, a plurality of partial allocations with the highest $Q_{1-X}$ are selected for subsequent operations. In the embodiment shown in FIG. 4, two partial allocations with the highest $Q_{1-X}$ are selected and the remaining partial allocations are discarded (represented by dotted circles in FIG. 4). Similarly, in the second step, calculation of all $Q_{2-X}$ is carried out, and two partial allocations with the highest $Q_{2-X}$ are selected for subsequent operations. When the method proceeds to the third step, in order to save computing resources, only partial allocations with the highest $Q_{3-X}$ are selected after calculation of all $Q_{3-X}$ is carried out. In this manner, as shown in FIG. 4, 4 operation sequences are determined, that is, $O_{1-1}$–$O_{2-1}$–$O_{3-1}$–$O_{4-1}$ corresponding to $S_{1-1}$–$S_{2-1}$–$S_{3-1}$–$S_{4-1}$, $O_{1-1}$–$O_{2-2}$–$O_{3-2}$–$O_{4-2}$ corresponding to $S_{1-1}$–$S_{2-2}$–$S_{3-2}$–$S_{4-2}$, $O_{1-2}$–$O_{2-3}$–$O_{3-3}$–$O_{4-3}$ corresponding to $S_{1-2}$–$S_{2-3}$–$S_{3-3}$–$S_{4-3}$, and $O_{1-2}$–$O_{2-4}$–$O_{3-4}$–$O_{4-4}$ corresponding to $S_{1-2}$–$S_{2-4}$–$S_{3-4}$–$S_{4-4}$. Then, a sum of Q values of each operation sequence is calculated, and it is confirmed that the value of $Q_{1-2}+Q_{2-4}+Q_{3-4}+Q_{4-4}$ is maximum. Therefore, partial allocations of steps corresponding to operation $O_{1-2}$–$O_{2-4}$–$O_{3-4}$–$O_{4-4}$ are selected to obtain the target allocation in the sequence form of partial allocations.

In this manner, the target allocation can be selected under the consideration of future information for each step, so as to obtain an optimized allocation scheme and improve the efficiency of the dedicated processing resources to process tasks.

Figure 5:
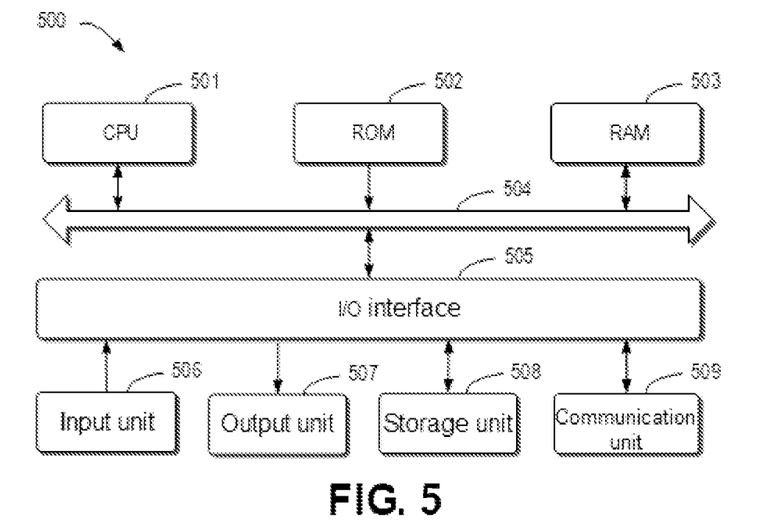
FIG. 5 is a block diagram of an example device that can be used to implement an embodiment of the present disclosure.

FIG. 5 is a schematic block diagram of example device 500 that can be used to implement an embodiment of the present disclosure. As shown in FIG. 5, device 500 includes CPU 501 which may perform various appropriate actions and processing according to computer program instructions stored in read-only memory (ROM) 502 or computer program instructions loaded from storage unit 508 to random access memory (RAM) 503. Various programs and data required for operations of device 500 may also be stored in RAM 503. CPU 501, ROM 502, and RAM 503 are connected to each other through bus 504. Input/output (I/O) interface 505 is also connected to bus 504.

A plurality of components in device 500 are connected to I/O interface 505, including: input unit 506, such as a keyboard and a mouse; output unit 507, such as various types of displays and speakers; storage unit 508, such as a magnetic disk and an optical disc; and communication unit 509, such as a network card, a modem, and a wireless communication transceiver. Communication unit 509 allows device 500 to exchange information/data with other devices via a computer network, such as the Internet, and/or various telecommunication networks.

CPU 501 may perform the various processes and processing described above, such as method 200 and process 400. For example, in some embodiments, method 200 and process 400 may be implemented as a computer software program that is tangibly included in a machine-readable medium, such as storage unit 508. In some embodiments, part of or all the computer program may be loaded and/or installed to device 500 via ROM 502 and/or communication unit 509. When the computer program is loaded to RAM 503 and executed by CPU 501, one or more actions in methods 200 and process 400 described above can be executed.

Illustrative embodiments of the present disclosure include a method, an apparatus, a system, and/or a computer program product. The computer program product may include a computer-readable storage medium on which computer-readable program instructions for executing various aspects of the present disclosure are loaded.

The computer-readable storage medium may be a tangible device that may retain and store instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in the computing/processing device.

The computer program instructions for executing the operation of the present disclosure may be assembly instructions, instruction set architecture (ISA) instructions, machine instructions, machine-dependent instructions, microcode, firmware instructions, status setting data, or source code or object code written in any combination of one or more programming languages, the programming languages including object-oriented programming languages such as Smalltalk and C++, and conventional procedural programming languages such as the C language or similar programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer may be connected to a user computer through any kind of networks, including a local area network (LAN) or a wide area network (WAN), or may be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions to implement various aspects of the present disclosure.

Various aspects of the present disclosure are described herein with reference to flow charts and/or block diagrams of the method, the apparatus (system), and the computer program product according to embodiments of the present disclosure. It should be understood that each block of the flow charts and/or the block diagrams and combinations of blocks in the flow charts and/or the block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer-readable program instructions may also be loaded to a computer, a further programmable data processing apparatus, or a further device, so that a series of operating steps may be executed on the computer, the further programmable data processing apparatus, or the further device to produce a computer-implemented process, such that the instructions executed on the computer, the further programmable data processing apparatus, or the further device may implement the functions/actions specified in one or more blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in a reverse order, which depends on involved functions. It should be further noted that each block in the block diagrams and/or flow charts as well as a combination of blocks in the block diagrams and/or flow charts may be implemented by using a special hardware-based system that executes specified functions or actions, or implemented by using a combination of special hardware and computer instructions.

Illustrative embodiments of the present disclosure have been described above. The above description is illustrative, rather than exhaustive, and is not limited to the disclosed various embodiments. Numerous modifications and alterations will be apparent to persons of ordinary skill in the art without departing from the scope and spirit of the illustrated embodiments. The selection of terms used herein is intended to best explain the principles and practical applications of the various embodiments or the improvements to technologies on the market, so as to enable persons of ordinary skill in the art to understand the embodiments disclosed herein.

What is claimed is:

1. A method for allocating tasks to dedicated processing resources, comprising:
   obtaining, in a processor-based machine learning system implementing a reinforcement learning model, an initial state of a group of dedicated processing resources;
   determining, in the processor-based machine learning system and in response to a request for receiving a group of tasks, a set of candidate allocations each indicating allocation of the group of tasks to the group of dedicated processing resources;
   determining, utilizing the reinforcement learning model of the processor-based machine learning system and based on the initial state, the reinforcement learning model being configured to receive as inputs a parameterized version of the initial state and one or more operations representative of respective ones of the candidate allocations, and to generate an operating state of the group of dedicated processing resources when executing the group of tasks according to each candidate allocation in the set of candidate allocations, the reinforcement learning model further generating, for each of one or more of the candidate allocations, at least a reward indicative of efficiency of that candidate allocation;
   selecting, in the processor-based machine learning system, a target allocation from the set of candidate allocations based on the operating state to enable the group of tasks to be executed on the group of dedicated processing resources according to the target allocation; and
   executing the group of tasks on the group of dedicated processing resources according to the target allocation.

2. The method according to claim 1, wherein determining the set of candidate allocations comprises:
   determining steps in which tasks in the group of tasks are executed;
   determining a group of task subsets based on a sequence of the steps, each task subset comprising tasks having the same sequence of the steps;
   determining a set of candidate partial allocations for each task subset, each of the candidate partial allocations indicating allocation of the task subset to the group of dedicated processing resources; and
   determining the set of candidate allocations based on the sets of candidate partial allocations for all task subsets.

3. The method according to claim 2, wherein determining the operating state comprises:
   in response to a determination that a first task subset is first executed, determining, based on the initial state, an operating state of the group of dedicated processing resources when executing the first task subset according to the partial allocation;
   in response to a determination that a third task subset is not first executed, determining, based on an operating state when a second task subset is executed, an operating state of the group of dedicated processing resources executing the third task subset, wherein the third task subset is executed immediately after the second task subset; and
   determining, based on operating states when all the task subsets are executed, the operating state when the group of tasks is executed.

4. The method according to claim 2, wherein determining a set of candidate partial allocations for each task subset comprises:
   selecting at least one candidate partial allocation from the set of candidate partial allocations based on an operating state of a current step.

5. The method according to claim 4, wherein selecting at least one candidate partial allocation from the set of candidate partial allocations comprises:
   selecting a plurality of candidate partial allocations from the set of candidate partial allocations in response to a determination that a sequence of steps in which the task subset is executed is less than or equal to a predetermined threshold; and
   selecting only one candidate partial allocation from the set of candidate partial allocations in response to a determination that the sequence of steps in which the task subset is executed is greater than the predetermined threshold.

6. The method according to claim 1, further comprising:
   determining steps in which tasks in the group of tasks are executed; and
   selecting a target allocation from the set of candidate allocations comprising:
   selecting the target allocation from the set of candidate allocations based on the operating state, the candidate allocations, and the number of steps in which the group of tasks are executed.

7. The method according to claim 6, wherein determining the operating state comprises:
   determining, based on the candidate allocations and the initial state and according to a trained state prediction model, a state representation for the operating state, a first value associated with the state representation, a weight for the first value associated with the number of the steps, and a second value associated with the candidate allocations,
   and selecting a target allocation from the set of candidate allocations comprises:
   selecting the target allocation from the set of candidate allocations based on the first value, the weight, and the second value.

8. An electronic device, comprising:
   at least one processor; and
   memory coupled to the at least one processor, wherein the memory has instructions stored therein which, when executed by the at least one processor, cause the electronic device to execute actions comprising:
   obtaining, in a processor-based machine learning system implementing a reinforcement learning model, an initial state of a group of dedicated processing resources;
   determining, in the processor-based machine learning system and in response to a request for receiving a group of tasks, a set of candidate allocations each indicating allocation of the group of tasks to the group of dedicated processing resources;
   determining, utilizing the reinforcement learning model of the processor-based machine learning system and based on the initial state, the reinforcement learning model being configured to receive as inputs a parameterized version of the initial state and one or more operations representative of respective ones of the candidate allocations, and to generate an operating state of the group of dedicated processing resources when executing the group of tasks according to each candidate allocation in the set of candidate allocations, the reinforcement learning model further generating, for each of one or more of the candidate allocations, at least a reward indicative of efficiency of that candidate allocation;

selecting, in the processor-based machine learning system, a target allocation from the set of candidate allocations based on the operating state to enable the group of tasks to be executed on the group of dedicated processing resources according to the target allocation; and executing the group of tasks on the group of dedicated processing resources according to the target allocation.

9. The electronic device according to claim 8, wherein determining the set of candidate allocations comprises:
  determining steps in which tasks in the group of tasks are executed;
  determining a group of task subsets based on a sequence of the steps, each task subset comprising tasks having the same sequence of the steps;
  determining a set of candidate partial allocations for each task subset, each of the candidate partial allocations indicating allocation of the task subset to the group of dedicated processing resources; and
  determining the set of candidate allocations based on the sets of candidate partial allocations for all task subsets.

10. The electronic device according to claim 9, wherein determining the operating state comprises:
  in response to a determination that a first task subset is first executed, determining, based on the initial state, an operating state of the group of dedicated processing resources when executing the first task subset according to the partial allocation;
  in response to a determination that a third task subset is not first executed, determining, based on an operating state when a second task subset is executed, an operating state of the group of dedicated processing resources executing the third task subset, wherein the third task subset is executed immediately after the second task subset; and
  determining, based on operating states when all the task subsets are executed, the operating state when the group of tasks is executed.

11. The electronic device according to claim 9, wherein determining a set of candidate partial allocations for each task subset comprises:
  selecting at least one candidate partial allocation from the set of candidate partial allocations based on an operating state of a current step.

12. The electronic device according to claim 11, wherein selecting at least one candidate partial allocation from the set of candidate partial allocations comprises:
  selecting a plurality of candidate partial allocations from the set of candidate partial allocations in response to a determination that a sequence of steps in which the task subset is executed is less than or equal to a predetermined threshold; and
  selecting only one candidate partial allocation from the set of candidate partial allocations in response to a determination that the sequence of steps in which the task subset is executed is greater than the predetermined threshold.

13. The electronic device according to claim 8, further comprising: determining steps in which tasks in the group of tasks are executed; and
  selecting a target allocation from the set of candidate allocations comprising:
    selecting the target allocation from the set of candidate allocations based on the operating state, the candidate allocations, and the number of steps in which the group of tasks are executed.

14. The electronic device according to claim 13, wherein determining the operating state comprises:
  determining, based on the candidate allocations and the initial state and according to a trained future prediction model, a state representation for the operating state, a first value associated with the state representation, a weight for the first value associated with the number of the steps, and a second value associated with the candidate allocations,
  and selecting a target allocation from the set of candidate allocations comprises:
    selecting the target allocation from the set of candidate allocations based on the first value, the weight, and the second value.

15. A computer program product tangibly stored on a non-transitory computer-readable storage medium and comprising machine-executable instructions, wherein the machine-executable instructions, when executed by a machine, cause the machine to perform a method for allocating tasks to dedicated processing resources, the method comprising:
  obtaining, in a processor-based machine learning system implementing a reinforcement learning model, an initial state of a group of dedicated processing resources;
  determining, in the processor-based machine learning system and in response to a request for receiving a group of tasks, a set of candidate allocations each indicating allocation of the group of tasks to the group of dedicated processing resources;
  determining, utilizing the reinforcement learning model of the processor-based machine learning system and based on the initial state, the reinforcement learning model being configured to receive as inputs a parameterized version of the initial state and one or more operations representative of respective ones of the candidate allocations, and to generate an operating state of the group of dedicated processing resources when executing the group of tasks according to each candidate allocation in the set of candidate allocations, the reinforcement learning model further generating, for each of one or more of the candidate allocations, at least a reward indicative of efficiency of that candidate allocation;
  selecting, in the processor-based machine learning system, a target allocation from the set of candidate allocations based on the operating state to enable the group of tasks to be executed on the group of dedicated processing resources according to the target allocation; and
  executing the group of tasks on the group of dedicated processing resources according to the target allocation.

16. The computer program product according to claim 15, wherein determining the set of candidate allocations comprises:
  determining steps in which tasks in the group of tasks are executed;

determining a group of task subsets based on a sequence of the steps, each task subset comprising tasks having the same sequence of the steps;

determining a set of candidate partial allocations for each task subset, each of the candidate partial allocations indicating allocation of the task subset to the group of dedicated processing resources; and determining the set of candidate allocations based on the sets of candidate partial allocations for all task subsets.

17. The computer program product according to claim 16, wherein determining the operating state comprises:

in response to a determination that a first task subset is first executed, determining, based on the initial state, an operating state of the group of dedicated processing resources when executing the first task subset according to the partial allocation;

in response to a determination that a third task subset is not first executed, determining, based on an operating state when a second task subset is executed, an operating state of the group of dedicated processing resources executing the third task subset, wherein the third task subset is executed immediately after the second task subset; and determining, based on operating states when all the task subsets are executed, the operating state when the group of tasks is executed.

18. The computer program product according to claim 16, wherein determining a set of candidate partial allocations for each task subset comprises:

selecting at least one candidate partial allocation from the set of candidate partial allocations based on an operating state of a current step.

19. The computer program product according to claim 18, wherein selecting at least one candidate partial allocation from the set of candidate partial allocations comprises:

selecting a plurality of candidate partial allocations from the set of candidate partial allocations in response to a determination that a sequence of steps in which the task subset is executed is less than or equal to a predetermined threshold; and selecting only one candidate partial allocation from the set of candidate partial allocations in response to a determination that the sequence of steps in which the task subset is executed is greater than the predetermined threshold.

20. The computer program product according to claim 15, further comprising:

determining steps in which tasks in the group of tasks are executed; and selecting a target allocation from the set of candidate allocations comprising:

selecting the target allocation from the set of candidate allocations based on the operating state, the candidate allocations, and the number of steps in which the group of tasks are executed.

* * * * *